US007945919B2

(12) United States Patent  (10) Patent No.: US 7,945,919 B2
Hara et al.  (45) Date of Patent: May 17, 2011

(54) INFORMATION PROCESSING APPARATUS AND DEVICE CONTROLLER DRIVING/CONTROLLING METHOD

(75) Inventors: Terunobu Hara, Ome (JP); Ken Hatano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 263 days.

(21) Appl. No.: 12/389,184

(22) Filed: Feb. 19, 2009

(65) Prior Publication Data

US 2009/0241132 A1  Sep. 24, 2009

(30) Foreign Application Priority Data

Mar. 18, 2008  (JP) ................................. 2008-070049

(51) Int. Cl.
 *G06F 9/44* (2006.01)
(52) U.S. Cl. ....................................... 719/327; 719/321
(58) Field of Classification Search .................. 719/321, 719/327
 See application file for complete search history.

(56) References Cited

U.S. PATENT DOCUMENTS

| | | | | |
|---|---|---|---|---|
| 5,910,180 | A * | 6/1999 | Flory et al. ..................... | 719/321 |
| 6,009,476 | A * | 12/1999 | Flory et al. ..................... | 719/324 |
| 6,070,204 | A * | 5/2000 | Poisner .......................... | 710/100 |
| 6,085,265 | A * | 7/2000 | Kou ............................... | 710/63 |
| 6,292,855 | B1 * | 9/2001 | Johnson et al. .................. | 710/33 |
| 6,480,914 | B1 * | 11/2002 | Hsieh ............................ | 710/73 |
| 6,772,266 | B2 * | 8/2004 | Nalawadi ....................... | 710/305 |
| 6,813,688 | B2 * | 11/2004 | Wu et al. ........................ | 711/114 |
| 6,895,588 | B1 * | 5/2005 | Ruberg .......................... | 719/321 |
| 7,287,257 | B2 * | 10/2007 | Meza .............................. | 719/321 |
| 7,650,436 | B2 * | 1/2010 | Bhesania et al. ................ | 710/8 |
| 2006/0095642 | A1 * | 5/2006 | Hesse et al. .................... | 710/313 |

FOREIGN PATENT DOCUMENTS

| | | |
|---|---|---|
| JP | H04-163621 A | 6/1992 |
| JP | 04-302341 | 10/1992 |
| JP | 06-103188 | 4/1994 |
| JP | 07-253850 | 10/1995 |
| JP | H08-036485 A | 2/1996 |
| JP | 10-133914 | 5/1998 |
| JP | 11-194847 | 7/1999 |
| JP | 2001-92646 | 4/2001 |
| JP | 2001-175463 A | 6/2001 |
| JP | 2002-63126 | 2/2002 |
| JP | 2004-213611 | 7/2004 |
| JP | 2005-275961 | 10/2005 |
| JP | 2006-215812 | 8/2006 |
| JP | 2007-219711 | 8/2007 |
| JP | 2007-287020 | 11/2007 |
| JP | 2007-304448 | 11/2007 |
| JP | 2008-27379 | 2/2008 |

OTHER PUBLICATIONS

Explanation of Non-English Language References.
Decision of Rejection mailed by Japan Patent Office on Oct. 20, 2009 in the corresponding Japanese patent application No. 2008-070049.
An English Translation of Notification of Reasons for Rejection mailed by Japan Patent Office for Japanese Patent Application No. 2008-070049 on May 26, 2009.

* cited by examiner

*Primary Examiner* — Van H Nguyen
(74) *Attorney, Agent, or Firm* — Knobbe, Martens, Olson & Bear LLP

(57) ABSTRACT

According to one embodiment, an information processing apparatus includes a system memory, a device controller, a basic input/output system and a device driver. The device driver of the information processing apparatus forms its own data structure for communication control in the system memory separately from the basic input/output system, saves the address set in the register of the device controller when the device controller executes the communication with the various externally connected devices, sets an address for referring to the own data structure in the register of the device controller in order to make the device controller communicate with the various externally connected devices, and resets the saved address in the register of the device controller after the communication is completed.

5 Claims, 5 Drawing Sheets

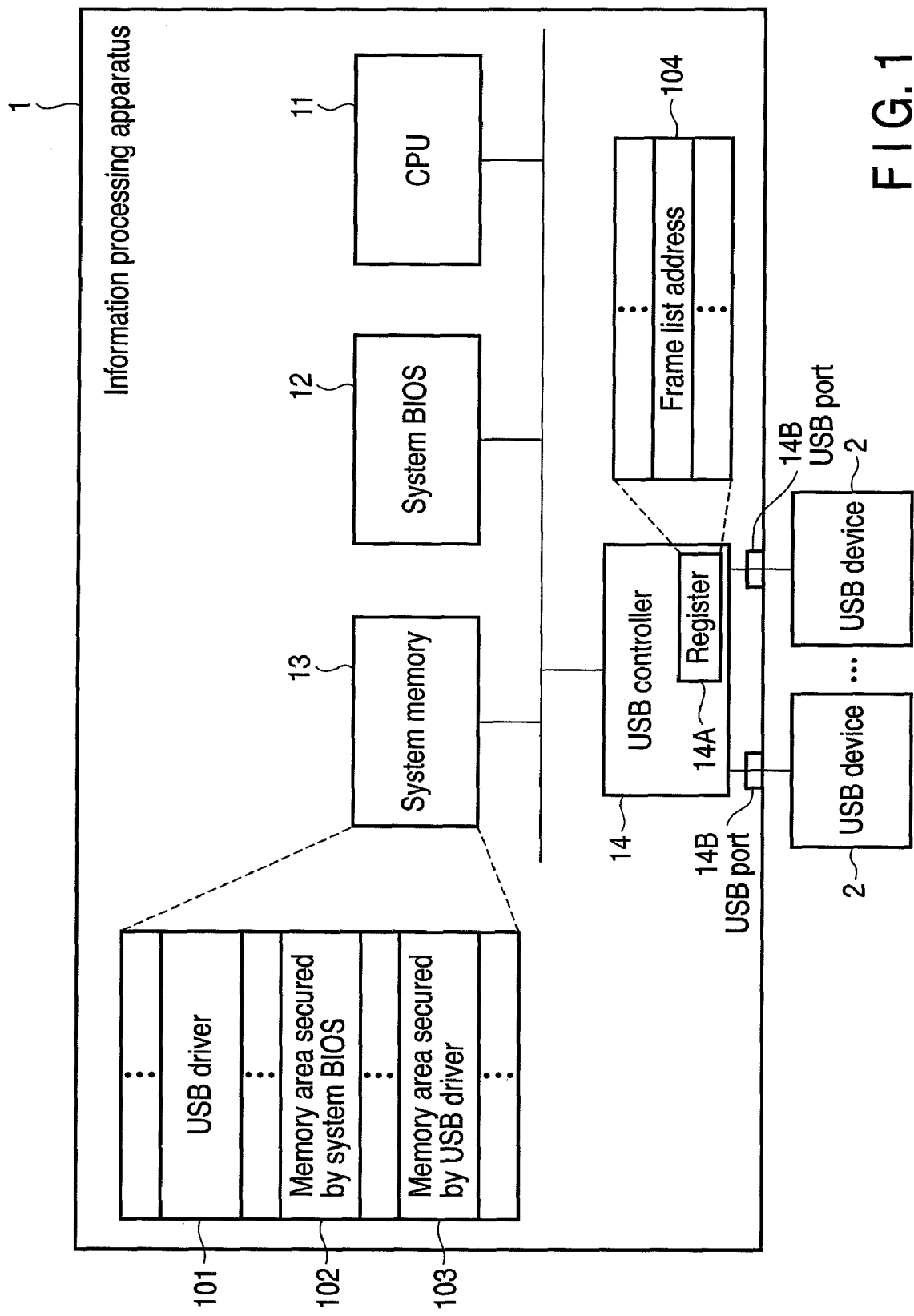
F I G. 1

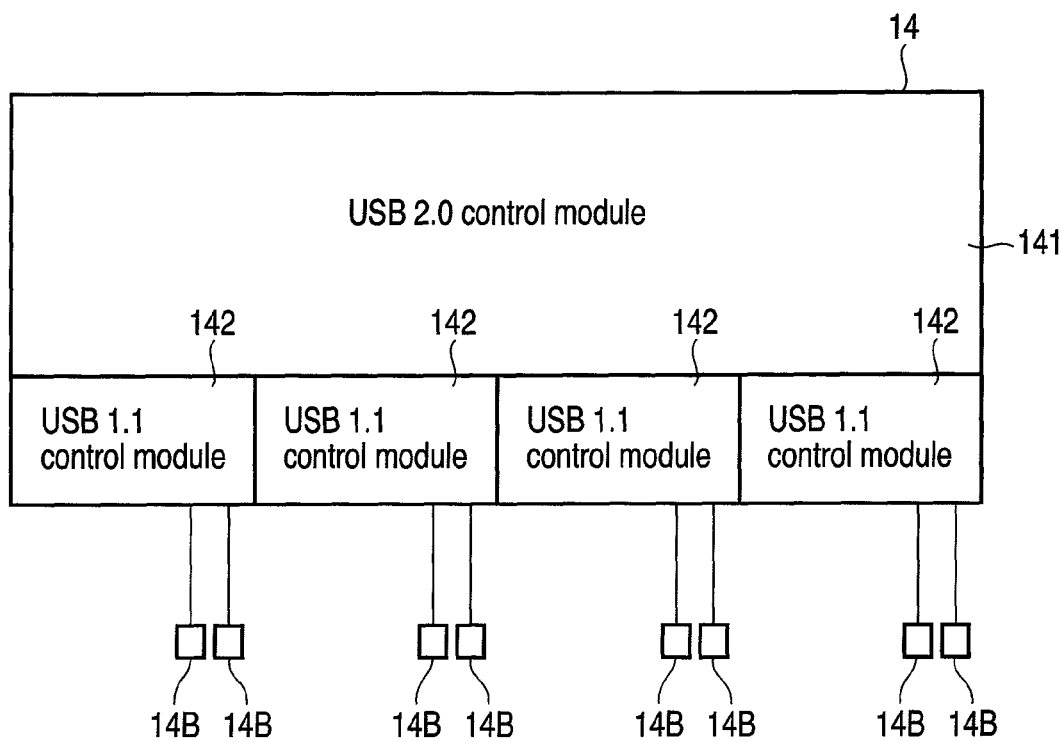
F I G. 3A
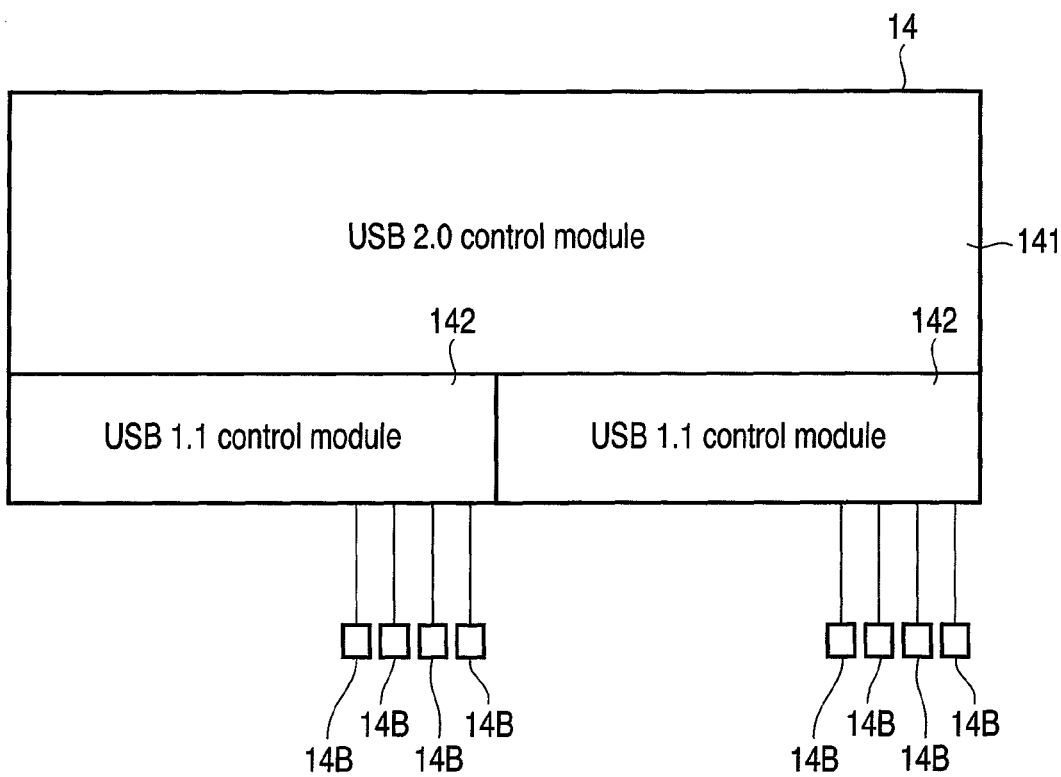
F I G. 3B

INFORMATION PROCESSING APPARATUS AND DEVICE CONTROLLER DRIVING/CONTROLLING METHOD

CROSS-REFERENCE TO RELATED APPLICATIONS

This application is based upon and claims the benefit of priority from Japanese Patent Application No. 2008-070049, filed Mar. 18, 2008, the entire contents of which are incorporated herein by reference.

BACKGROUND

1. Field

One embodiment of the present invention relates to a method of driving and controlling a USB controller, which is suitably used in a personal computer including a Universal Serial Bus (USB) connector, and communicates with a USB device connected through the USB connector.

2. Description of the Related Art

A notebook computer operable on batteries has been widely used in recent years. Such a computer is usually provided with two or more USB connectors, and is formed to connect and use various devices (USB devices) if necessary.

In other words, such a computer is made compact and light in weight by incorporating basic resources only. Various proposals have been made to effectively use the various devices (e.g., Jpn. Pat. Appln. KOKAI Publication No. 2001-175463).

Communication with a USB device connected through a USB connector (including communication with an internal USB device if it is incorporated) is executed by a USB controller. The USB controller is driven and controlled by a basic input/output system (BIOS), before an operating system (OS) is started up.

In contrast to the above, when a USB controller communicates with a USB device, which has a specific function, and requires specific communication, the USB controller is driven and controlled by a USB driver prepared separately from the BIOS. Thus, when an ordinary USB device and a specific USB device coexist under the control of the same USB controller, the same USB controller is separately controlled by the BIOS and USB driver.

To make a USB controller communicate with a USB device, it is necessary to form a data structure for communication control containing a frame list, a queue head, a transfer descriptor and a data transfer buffer, in a system memory. In the prior art, when one USB controller is separately controlled by a BIOS and USB driver as described above, a USB driver uses a frame list prepared by a BIOS as a frame list forming an entry of the data structure, and prepares its own queue head, transfer descriptor and data transfer buffer.

Thus, a frame list prepared by a BIOS may be overwritten at the timing unexpected by the BIOS. To prevent malfunctions of both BIOS and USB driver, updating of the frame list by a BIOS is stopped while the USB driver is operating.

However, if so, a BIOS cannot communicate with a USB device by using a USB controller until the USB driver terminates its operation, regardless of whether or not a USB driver is actually communicating with a USB device. Therefore, a USB device requiring control of BIOS even while the USB driver is operating must be connected to another USB controller different from a USB controller controlled by the USB driver.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary diagram showing a configuration of an information processing apparatus according to an embodiment of the invention;

FIG. 3A and FIG. 3B are exemplary diagrams showing functional blocks of a USB controller incorporated in the information processing apparatus of the embodiment;

DETAILED DESCRIPTION

Figure 2:
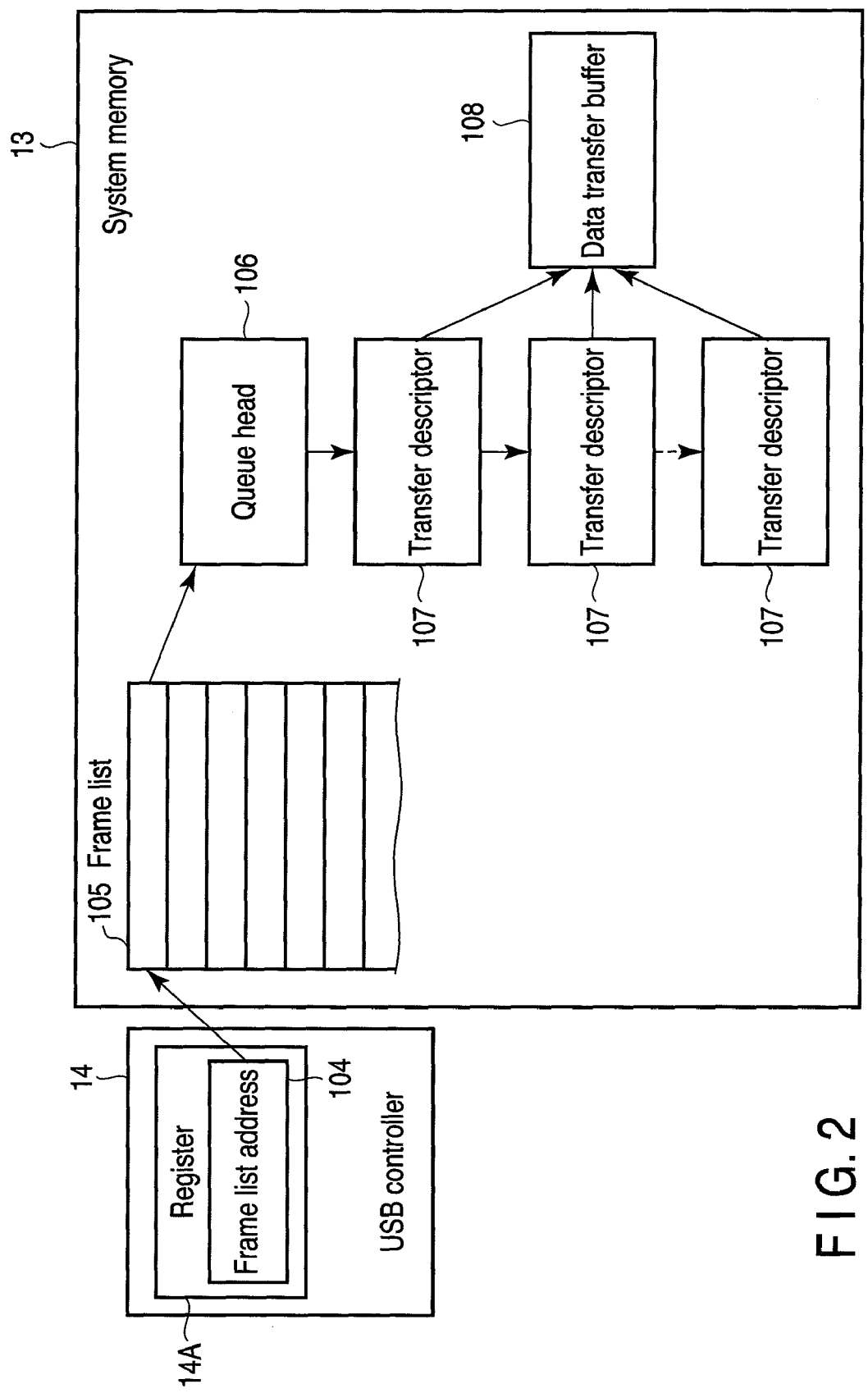
FIG. 2 is an exemplary diagram showing a configuration of a data structure for communication control used in the information processing apparatus of the embodiment, and for explaining the procedure of referring the data structure.

Various embodiments according to the invention will be described hereinafter with reference to the accompanying drawings. In general, according to one embodiment of the invention, an information processing apparatus includes a system memory, a device controller, a basic input/output system and a device driver. The device driver of the information processing apparatus forms its own data structure for communication control in the system memory separately from the basic input/output system, saves the address set in the register of the device controller when the device controller executes the communication with the various externally connected devices, sets an address for referring to the own data structure in the register of the device controller in order to make the device controller communicate with the various externally connected devices, and resets the saved address in the register of the device controller after the communication is completed.

FIG. 1 shows an exemplary configuration of an information processing apparatus according to an embodiment of the invention. An information processing apparatus 1 is realized as a battery-operated notebook computer, for example.

As shown in FIG. 1, the information processing apparatus 1 includes a CPU 11, a system BIOS 12, a system memory 13, and a USB controller 14. If necessary, various USB devices 2 are connected to USB ports 14B.

The CPU 11 is a processor to control the operation of the information processing apparatus 1, which executes various programs loaded in the system memory 13, such as an operating system, utilities and applications. As one of the various programs, there is a USB driver 101 to control the USB controller 14 for communicating with the USB device 2 connected to the USB port 14B.

The CPU 11 also executes the system BIOS 12. The system BIOS 12 is a hardware control program, and functions to control the USB controller 14 to communicate with the USB 2 connected to the USB port 14B.

Namely, in the information processing apparatus 1, a function to control the USB controller 14 to communicate with the USB device 2 connected to the USB port 14B is provided at two locations, that is, the system BIOS 12 and US driver 101. Because, there are many kinds of USB device 2, and the system BIOS 12 is unable to meet all kinds of USB device 2. Therefore, the USB driver 101 is used to communicate with the USB device 2 unsupported by the system BIOS 12.

The USB controller 14 communicates with the USB device 2 connected to the USB port 14B, under the control of the system BIOS 12 or USB driver 101. The USB controller 14 includes a register 14A to input an instruction from the system BIOS 12 or USB driver 101. A frame list address 104, described later, is set in the register 14A.

The system BIOS 12 and USB driver 101 ensure areas (102 and 103 in FIG. 1) to form a data structure for communication control in the system memory 13, so that the USB controller 14 communicates with the USB device 2 connected to the USB port 14B. The system BIOS 12 and USB driver 101 set an address to refer to the data structure, concretely the above-mentioned frame list address 104, in the resister 14A.

Next, an explanation will be given on the configuration of the data structure, and how the USB controller 14 refers to the data structure, by referring to FIG. 2.

As shown in FIG. 2, the data structure for communication control includes a frame list 105, a queue head 106, a transfer descriptor 107 and a data transfer buffer 108.

The frame list 105 is a list to set the address of the queue head 106 to be processed by the USB controller 14. The queue head 106 is an area to set the address of the transfer descriptor 107 to be processed by the USB controller 14. The transfer descriptor 107 is an area to set the information about the USB device 2 to communicate with, and the address of the data in the data transfer buffer 108 as an object of communication.

The USB controller 14 sequentially refers to the frame list 105, queue head 106, transfer descriptor 107 and data transfer buffer 108, based on the frame list address 104 set in the register 14A, and communicates with the USB device 2.

FIG. 3A and FIG. 3B show functional blocks of the USB controller 14. It is assumed here that one USB controller 14 communicates with a maximum of eight sets of USB device 2 at the same time.

As a USB that is an interface standard between a computer and a peripheral device, there are an USB 1.1 communicable at a data transfer rate of 1.5 or 12 Mbps, and an USB 2.0 that is an upper standard of the USB 1.1 and is communicable at data transfer rate of 480 Mbps. Therefore, the USB controller 14 includes a USB 2.0 control module 141 to control communication conforming to the USB 2.0 standard, and a USB 1.1 control module 142 conforming to the USB 1.1 standard.

When the USB device 2 connected through the USB port 14B executes communication conforming to the USB 1.1 standard, the communication with the USB device 2 is executed only by the USB 1.1 control module 142. When the USB device 2 executes communication conforming to the USB 2.0 standard, the USB 1.1 control module 142 requests the USB 2.0 control module 141 to communicate, and the USB 2.0 control module 141 communicates with the USB device 2 through the USB 1.1 control module 142.

Assuming simultaneous communication with two or more USB devices 2, the USB controller 14 is usually provided with one USB 1.1 control module 142 for two USB devices 2 (see FIG. 3A), or one USB 1.1 control module 142 for four USB devices 2 (see FIG. 3B). In either case, one USB 2.0 control module 141 is usually provided in one USB controller 14.

It is now assumed that the USB ports 14B are simultaneously connected with a USB device 2 supported by the system BIOS 12, and a USB device 2 unsupported by the system BIOS 12 that is a USB device 2 to be controlled by the USB driver 101.

As described above, the USB controller 14 communicates with the USB device 2 by referring to the data structure comprising the frame list 105, queue head 106, transfer descriptor 107 and data transfer buffer 108, based on the frame restore address 104 set in the register 14A. Therefore, when the USB driver 101 uses the frame list 105 prepared by the system BIOS 12 as in the prior art, while the USB driver 101 is operating, the system BIOS 12 is required to control the USB controller 14 to restrict communication with the USB device 2. Therefore, if the system BIOS 12 is required to communicate with the USB device 2 even while the USB driver 101 is operating, it is necessary to connect the USB devices 2 to different USB controllers 14. Namely, as shown in FIGS. 3A and 3B, though one USB controller 14 can control a maximum of eight sets of USB device 2, even if there is a space in the USB port 14B, another USB controller 14 must be added.

The information processing apparatus 1 is provided with a scheme to realize appropriate drive control of the same USB controller 14 by the system BIOS 12 and USB driver 101. Hereinafter, an explanation will be given on this point.

Figure 4:
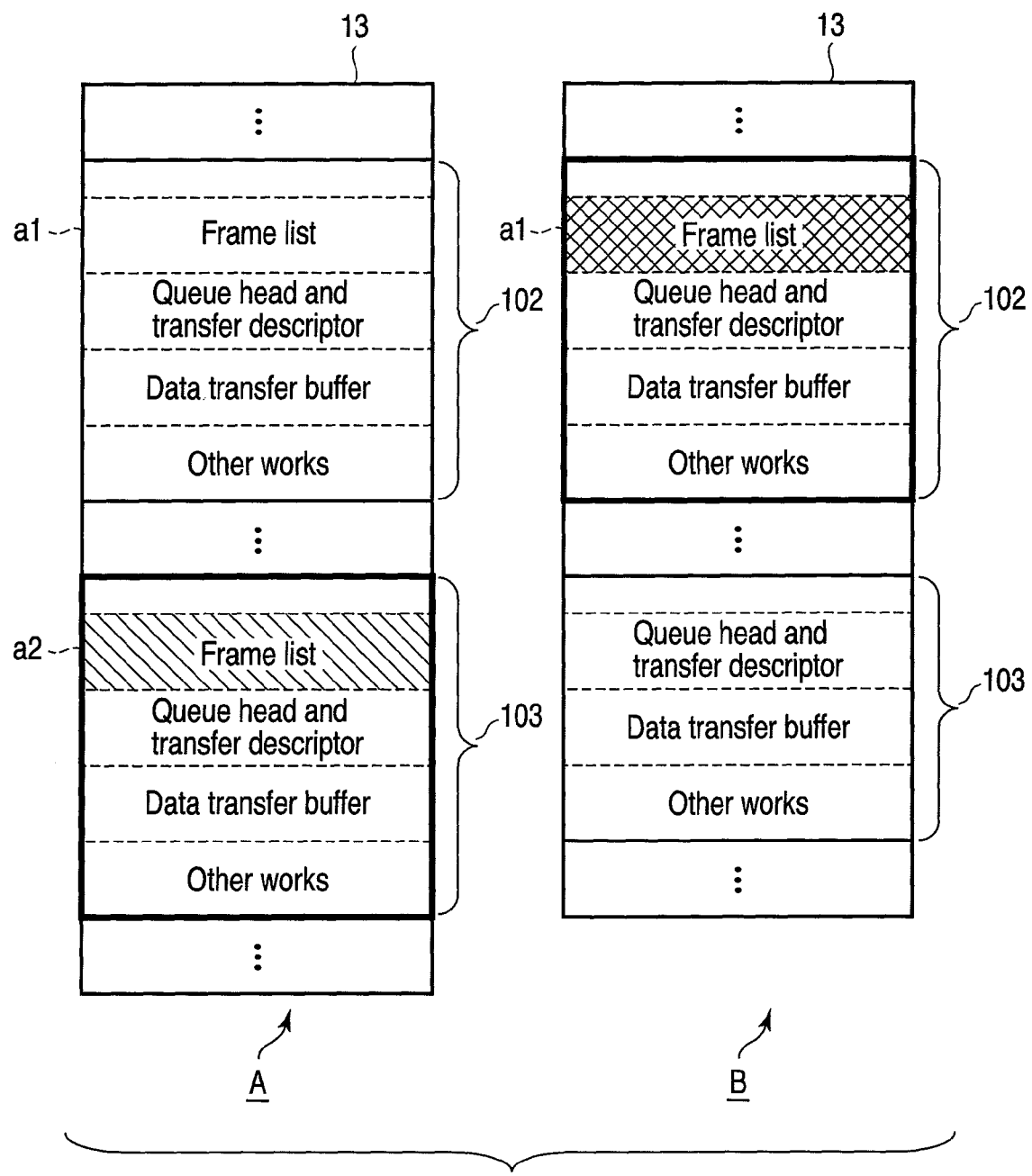
FIG. 4 is an exemplary diagram showing a detail of areas secured in a system memory by a system BIOS and USB driver operating in the information processing apparatus of the embodiment.

FIG. 4 shows a detail of areas secured in a system memory by the system BIOS 12 and USB driver 101. "A" shows a detail of areas secured in the system memory 13 of the information processing apparatus 1. "B" shows a detail of areas secured in the system memory 13 in the prior art.

At first, an explanation will be given on the detail of the areas secured in the system memory 13 in the prior art, by referring to the "B". The USB driver 101 prepares the queue head 106, transfer descriptor 107 and data transfer buffer 108 in the area 103, but uses the frame list 105 prepared by the system BIOS 12 ("a1" in the "B" in FIG. 4).

The USB driver 101 saves the contents of the frame list 105 set by the system BIOS 12 in another workarea in the area 103 secured by itself, when starting communication with at least one USB device 2, and restores the saved set contents in the frame list 105, when the communications with all USB devices 2 are completed. In this case, all necessary work is only rewriting of data in the system memory 13, and it is unnecessary to update the frame list address 104 set in the register 14A provided in the USB controller 14. However, in the period from the start to end of the USB driver 101 operation, communication with the USB driver 2 supported by the system BIOS 12 becomes impossible.

For example, when using the USB device 2 (supported by the USB driver 101) for reading a fingerprint and authenticating a user, if the image data of the read fingerprint is transmitted/received to/from the USB device 2 by dividing into several ten times to several hundred times, the USB device 2 supported by the system BIOS 12 cannot be used until the data transmission/reception is completed.

Next, an explanation will be given on the detail of the areas secured in the system memory 13 in the information processing apparatus 1, by referring to the "A" in FIG. 4. The USB driver 101 prepares its own frame list 105 in the area 103 secured by itself, in addition to the queue head 106, transfer descriptor 107 and data transfer buffer 108 ("a2" in the "A" in FIG. 4).

To make the USB controller 14 refer to the frame list 105, it is necessary to set the address of the frame list in the register 14A provided in the USB controller 14. For this purpose, the USB driver 101 of the information processing apparatus 1 once stops the USB controller 14 at the beginning of operation, save the set contents of the register 14A in another workarea of the area 103 secured by itself, and sets the address of the frame list in the register 14A of the USB controller 14. Then, the USB driver 101 restarts the stopped USB controller 14. As a result, the USB controller 14 executes the communication with the USB device 2 intended by the USB driver 101.

Further, the USB driver 101 checks whether or not the communication with the USB driver 2 is completed whenever data is transferred. When the communication is completed, the USB driver 101 stops again the USB controller 14, and restores the set contents saved in another workarea in the area 103 secured by itself, in the register 14A of the USB controller 14. Then, the USB driver 101 restarts the stopped USB controller 14. As a result, the USB controller 14 resumes the communication with the USB device 2 intended by the system BIOS 12.

Thereafter, whenever the communication with the USB device 2 becomes necessary, the USB driver 101 repeats the above steps, that is, stopping the USB controller 14, updating the register 14A, restarting the USB controller 14, stopping the USB controller 14, restoring the register 14A and restarting the USB controller 14. When the communications with all USB devices 2 are completed, the USB driver 101 terminates its own operation.

As described above, in the information processing apparatus 1, the USB driver 101 prepares its own frame list 105, and makes the USB controller 14 appropriately refer to the frame list 105. After the USB driver 101 starts operation, the communication with the USB device 2 supported by the system BIOS 12 becomes possible without waiting for the end of the operation of the USB driver 101. Therefore, when communication with the USB device 2 supported by the system BIOS 12 becomes necessary even during operation of the USB driver 101, it is unnecessary to add another USB controller 14.

Figure 5:
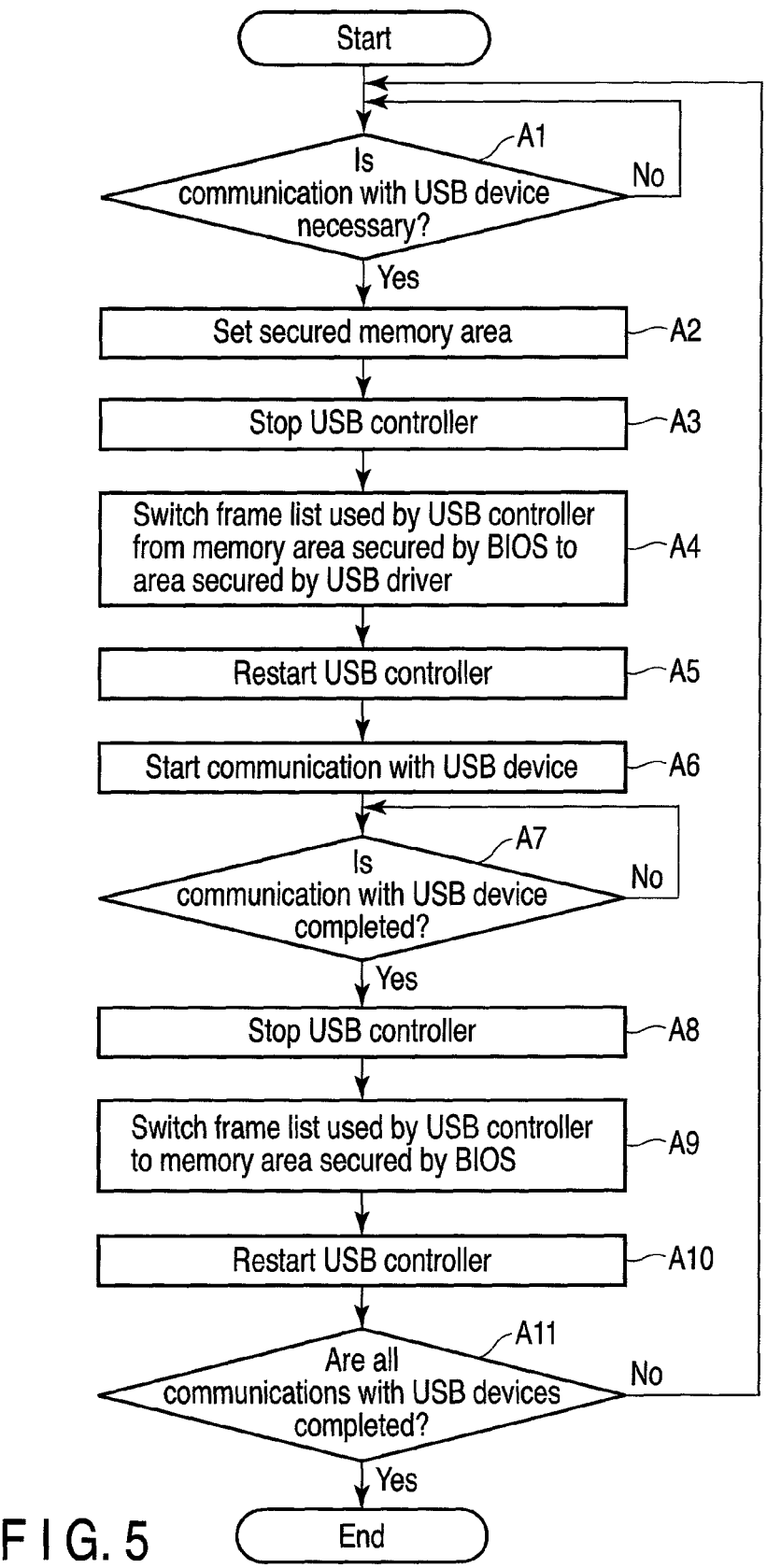
FIG. 5 is an exemplary flowchart showing an operating procedure of a USB driver in the information processing apparatus of the embodiment.

FIG. 5 is an exemplary flowchart showing the operating procedure of the USB driver 101 in the information processing apparatus 1.

When communication with the USB device 2 becomes necessary (YES in block A1), the USB driver 101 sets the communication contents at first by forming a data structure for communication control in an area secured in the system memory 13 (block A2).

Next, the USB driver 101 once stops the USB controller 14 (block A3), updates the register 14A provided in the USB controller 14, and switches the frame list used by the USB controller 14 to its own frame list (for the USB driver 101) (block A4). Then, the USB driver 101 restarts the stopped USB controller 14 (block A5). As a result, communication with the object USB device 2 is started (block A6).

When the above communication is finished (YES in block A7), the USB driver 101 stops again the USB controller 14 (block A8), updates the register 14A provided in the USB controller 14, switches the frame list used by the USB controller 14 to the one for the system BIOS 12 (block A9), and restarts the stopped USB controller 14 (block A10).

The USB driver 101 checks whether the communications with all USB devices 2 are completed (block A11). If the communications are not completed (NO in block A11), the USB driver 101 repeats the operations of blocks A1 to A10. If the communications are completed (YES in block A11), the USB driver 101 terminates its own operation.

As described herein, the information processing apparatus 1 realizes appropriate drive control of the same USB controller 14 by the system BIOS 12 and USB driver 101.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a system memory;
a device controller, which comprises a register in order to set a first address assigned in the system memory, configured to communicate with externally connected devices by referring to a first data structure for controlling communication on the system memory based on the first address set in the register;
a basic input and output system configured to construct the first data structure for controlling communication on the system memory, and to set the first address for referring to the first data structure in the register of the device controller in order to cause the device controller to communicate with the externally connected devices; and
a device driver configured to construct a second data structure for controlling communication on the system memory separately from the basic input and output system, to save the first address set in the register of the device controller when the device controller communicates with the externally connected devices, to set a second address for referring to the second data structure in the register of the device controller in order to cause the device controller to communicate with the externally connected devices, and to restore the saved first address in the register of the device controller after the communication is completed.

2. The information processing apparatus of claim 1, wherein the device driver is configured to stop the device controller when the device driver sets an address in the register of the device controller, and to restart the device controller after the address is set.

3. The information processing apparatus of claim 1, wherein the device driver is configured to restore the saved first address in the register of the device controller for causing the device controller to return to a state being under control of the basic input and output system when communication with at least one of the externally connected devices addressed by the second data structure is completed.

4. The information processing apparatus of claim 1, wherein the device controller is configured to communicate with the externally connected devices in a communication procedure conforming to the Universal Serial Bus (USB) standards.

5. A method of driving and controlling a device controller of a computer comprising a system memory, the device controller, which comprises a register to set an address assigned in the system memory, configured to communicate with externally connected devices by referring to a first data structure for controlling communication on the system memory based on the first address set in the register, and a basic input and output system configured to construct the first data structure for controlling communication on the system memory, and to set a first address for referring to the first data structure in the register of the device controller in order to cause the device controller to communicate with the externally connected devices, the method comprising:

constructing a second data structure for controlling communication on the system memory separately from the basic input and output system by a device driver configured to cause the device controller to communicate with the externally connected devices separately from the basic input and output system operating in the computer;

saving by the device driver the first address set in the register of the device controller when the device controller communicates with the externally connected devices;

setting a second address for referring to the second data structure formed separately from the basic input and output system in the register of the device controller in order to cause the device controller to communicate with the externally connected devices; and restoring the saved first address in the register of the device controller after the communication is completed.

* * * * *